(12) United States Patent
Wang et al.

(10) Patent No.: US 9,926,216 B2
(45) Date of Patent: Mar. 27, 2018

(54) SLUDGE DEHYDRATING SYSTEM AND METHOD THEREOF BASED ON THERMAL HYDROLYSIS TECHNOLOGY

(71) Applicants: XI'AN JIAOTONG UNIVERSITY, Xi'an, Shaanxi (CN); XI'AN WONFU ENERGY AND ENVIRONMENT TECHNOLOGIES CO., LTD., Xi'an, Shaanxi (CN)

(72) Inventors: Shuzhong Wang, Shaanxi (CN); Lili Qian, Shaanxi (CN); Xingying Tang, Shaanxi (CN); Panpan Sun, Shaanxi (CN)

(73) Assignees: XI'AN JIAOTONG UNIVERSITY, Xi'an, Shaanxi (CN); XI'AN WONFU ENERGY AND ENVIRONMENT TECHNOLOGIES CO., LTD., Xi'an, Shaanxi (CN)

( * ) Notice: Subject to any disclaimer, the term of this patent is extended or adjusted under 35 U.S.C. 154(b) by 194 days.

(21) Appl. No.: 14/917,013

(22) PCT Filed: Nov. 10, 2014

(86) PCT No.: PCT/CN2014/090726
§ 371 (c)(1),
(2) Date: Mar. 6, 2016

(87) PCT Pub. No.: WO2015/149520
PCT Pub. Date: Oct. 8, 2015

(65) Prior Publication Data
US 2016/0194231 A1 Jul. 7, 2016

(30) Foreign Application Priority Data

Apr. 3, 2014 (CN) .......................... 2014 1 0133537

(51) Int. Cl.
*C02F 11/12* (2006.01)
*C02F 11/10* (2006.01)
(Continued)

(52) U.S. Cl.
CPC .............. *C02F 11/12* (2013.01); *C02F 1/025* (2013.01); *C02F 11/10* (2013.01); *C02F 1/06* (2013.01);
(Continued)

(58) Field of Classification Search
CPC .. C02F 1/025; C02F 1/06; C02F 11/10; C02F 11/12; C02F 11/121; C02F 2301/026;
(Continued)

(56) References Cited

U.S. PATENT DOCUMENTS 5,266,085 A 11/1993 McMahon et al.

FOREIGN PATENT DOCUMENTS

WO 2013167469 11/2013

*Primary Examiner* — Lucas Stelling

(57) ABSTRACT

A sludge dehydrating system and a method thereof based on a thermal hydrolysis technology include: a homogeneous slurry unit, a hydrothermal unit, a flash reactor, a waste heat recovery unit, and a dehydrator; wherein a viscosity of sludge is lowered by homogenously slurrying before entering a pump, which is conducive to transportation; a sludge tank firstly crashes and then quantitatively transports for improving a homogenizing efficiency; a diluent is sludge dehydrated filtrate which is mixed with flash steam in an ejector, wherein an mixing efficiency is high; during homogenously slurrying, waste steam generated is added into a sludge diluent pipe for being absorbed; a hydrothermal unit include a variety of forms such as an intermittent form and a continuous form, in such a manner that reaction parameters, especially reaction time are effectively guaranteed; the flash steam enters the homogeneous slurry unit for heating the sludge.

10 Claims, 3 Drawing Sheets

(51) Int. Cl.
*C02F 1/02* (2006.01)
*C02F 1/06* (2006.01)
(52) U.S. Cl.
CPC ....... *C02F 11/121* (2013.01); *C02F 2301/026* (2013.01); *C02F 2303/06* (2013.01); *C02F 2303/10* (2013.01); *Y02W 10/30* (2015.05); *Y02W 10/40* (2015.05)
(58) Field of Classification Search
CPC . C02F 2303/06; C02F 2303/10; Y02W 10/30; Y02W 10/40
See application file for complete search history.

| legend | name | legend | name |
|--------|------|--------|------|
|  | electric stop valve |  | cross tube |
|  | input or output |  | pipeline intersection |

SLUDGE DEHYDRATING SYSTEM AND METHOD THEREOF BASED ON THERMAL HYDROLYSIS TECHNOLOGY

CROSS REFERENCE OF RELATED APPLICATION

This is a U.S. National Stage under 35 U.S.C. 371 of the International Application PCT/CN2014/090726, filed Nov. 10, 2014, which claims priority under 35 U.S.C. 119(a-d) to CN 201410133537.5, filed Apr. 3, 2014.

BACKGROUND OF THE PRESENT INVENTION

1. Field of Invention

The present invention relates to a technical field of sludge treatment, and more particularly to an urban sludge dehydrating system and a method thereof.

2. Description of Related Arts

Urban sludge is a byproduct of city sewage treatment, which is a general designation of substances such as a small amount of sediments, particulate matters and floating matters formed during urban sewage treatment with conventional methods. The urban sludge mainly has the following characteristics:

(1) large amount and low harmlessness rate: an annual output of sludge is 28 million tons (with a water content of 80%, according to year 2011), wherein ¾ thereof is not effectively treated;

(2) high water content, and moisture which is difficult to be removed: according to conventional mechanical dehydrating method of sludge, a water content of the sludge is only able to be decreased to about 80%;

(3) harmfulness and usefulness: there are a variety of organic pollutants and heavy metals in the urban sludge, so direct emission is harmful to environments; however, with a high calorific value (7500-15000 kJ/kg for dry sludge), the urban sludge is applicable to resource utilization.

Conventionally, composting, land-filling and incinerating are common methods for sludge treatment, all of which have certain requirements on the water content of the sludge. For example, sludge landfill needs a water content of less than 60%, sludge compost needs to add a swelling agent for adjusting a water content to about 50%, and sludge incineration needs to reduce a water content to about 30%. Therefore, with the water content of about 80%, the wet sludge must be further dehydrated.

A thermal drying method is suitable for further dehydrating the sludge, which is able to reduce the water content of the sludge to less than 50% with sufficient volume reduction effect and product stability. However, the method has high technology requirements, complex management, large energy consumption, and high treatment costs. According to the sludge thermal drying method, evaporation of 1 ton water consumes 887025 kcal heat which equals to 107 $m^3$ natural gas with a heat value of 8300 kcal. Supposing that a water content of the wet sludge is 80% and needs to be dried to 10%, then 1 ton dry sludge consumes approximately 428 $m^3$ natural gas and 300 kW·h electricity, which means a dehydrating cost of 1 ton dry sludge is up to 1144.9 RMB (excluding staff salaries, depreciation, etc.). Therefore, even equipments are built on, production cost is unaffordable. Accordingly, an economical method is urgently needed to replace the conventional thermal drying method.

According to sludge hydrothermal treatment technology, the sludge is heated so as to hydrolyze viscous organics in the sludge at a certain temperature and pressure, for destroying a gel structure sludge, improving dehydrating performance and improving anaerobic digestion performance. The technology is also known as thermal conditioning. The hydrothermal treatment technology is divided into thermal hydrolysis and wet oxidation in accordance with whether oxidant is added. The thermal hydrolysis needs no oxidant, while the wet oxidation needs to add oxidant into a reactor.

The sludge thermal hydrolysis technology further efficiently and economically reduces the water content of the sludge, which is based on a cell disruption principle, and is able to dewater and dry the sludge with low power consumption and high efficiency. However, conventional thermal hydrolysis systems are easy to be blocked, and volume reduction effect thereof is ineffective.

SUMMARY OF THE PRESENT INVENTION

An object of the present invention is to provide a sludge dehydrating system and a method thereof based on a thermal hydrolysis technology, the sludge dehydrating system and method effectively a water content of dehydrated sludge, so as to meet requirements of volume reduction. Furthermore, the system is difficult to be blocked.

Accordingly, in order to accomplish the above objects, the present invention provides a sludge dehydrating system based on a thermal hydrolysis technology, comprising: a homogeneous slurry unit, a hydrothermal unit, a flash reactor, a waste heat recovery unit, and a dehydrator;

wherein the homogeneous slurry unit comprises a sludge tank, a sludge homogenizer and a first single-screw pump; wherein a bottom portion of the sludge tank is connected to a sludge inlet at a bottom portion of the sludge homogenizer; a sludge outlet at a top portion of the sludge homogenizer is connected to an inlet of the hydrothermal unit;

wherein an outlet of the hydrothermal unit is connected to an inlet at a top portion of the flash reactor, and a sludge outlet at a bottom portion of the flash reactor is connected to an inlet of the waste heat recovery unit;

wherein an outlet of the waste heat recovery unit is connected to the dehydrator; a dehydrating filtrate outlet pipe of the dehydrator is connected to an inlet of a first low-voltage variable-frequency pump, an outlet of the first low-voltage variable-frequency pump is connected to an ejecting fluid inlet of an ejector; a steam outlet of the flash reactor is connected to an ejected fluid inlet of the ejector, an outlet of the ejector is connected to an ejecting mixture inlet at the bottom portion of the sludge homogenizer, a waste steam outlet at the top portion of the sludge homogenizer is connected to a sludge diluent outlet of the dehydrator.

Preferably, the sludge outlet of the flash reactor is connected to an inlet of a second single-screw pump, an outlet of the second single-screw pump is connected a shell-side inlet of a heat exchanger; a water feeding pipe of a boiler and a cooled water outlet of a cooling tower are connected to an inlet of a second low-voltage variable-frequency pump, an outlet of the second low-voltage variable-frequency pump is connected to a pipe-side inlet of the heat exchanger; a pipe-side outlet of the heat exchanger is divided into two portions and respectively connected to an inlet of a furnace and an inlet of the cooling tower; a shell-side outlet of the heat exchanger is connected to the dehydrator.

Preferably, the sludge tank is placed above the sludge homogenizer; the sludge homogenizer is placed above the first single-screw pump.

Preferably, the hydrothermal unit is an intermittent hydrothermal unit or a continuous hydrothermal unit;

wherein the intermittent hydrothermal unit comprises a hydrothermal steam heater, a first intermittent hydrothermal reactor and a second intermittent hydrothermal reactor; wherein an outlet of the first single-screw pump is connected to a sludge inlet at a bottom portion of the hydrothermal steam heater, a steam outlet of the furnace is connected to a hydrothermal steam inlet at the bottom portion of the hydrothermal steam heater, an outlet at a top portion of the hydrothermal steam heater is connected to the first intermittent hydrothermal reactor and the second intermittent hydrothermal reactor, wherein the first intermittent hydrothermal reactor and the second intermittent hydrothermal reactor are connected to each other in parallel; electric stop valves are provided at inlets and outlets of the first intermittent hydrothermal reactor and the second intermittent hydrothermal reactor; the outlets of the first intermittent hydrothermal reactor and the second intermittent hydrothermal reactor are connected to the inlet at the top portion of the flash reactor;

wherein the continuous hydrothermal unit comprises a continuous hydrothermal reactor, wherein the continuous hydrothermal reactor is a radial flow hydrothermal reactor or a tower hydrothermal reactor;

wherein the radial flow hydrothermal reactor is a container with a height-diameter ratio of less than 1, comprising an inner barrel, a guide barrel, an outer barrel, an inner barrel stirrer, and a barrel wall; wherein the inner barrel stirrer is provided inside the inner barrel, the guide barrel is provided outside the inner barrel, the outer barrel is provided at an inner circumference of the barrel wall; the outlet of the first single-screw pump and the steam outlet of the furnace are connected to an inlet pipe at a bottom of the inner barrel, an outlet at a bottom portion of a loop space formed between the outer barrel and the barrel wall is connected to the inlet at the top portion of the flash reactor;

wherein the tower hydrothermal reactor is a container with an inlet at a bottom portion thereof, an outlet at a top portion thereof, and a height-diameter ration of larger than 2; an axial-force stirrer is provided at the bottom portion of the tower hydrothermal reactor, a non-axial-force stirrer is provided at the top portion of the tower hydrothermal reactor; the outlet of the first single-screw pump and the steam outlet of the furnace are connected to the inlet at the bottom of the tower hydrothermal reactor, the outlet at the top portion of the tower hydrothermal reactor is connected to the inlet at the top portion of the flash reactor.

The present invention also provides a sludge dehydrating method based on a thermal hydrolysis technology, comprising steps of:

1) storing mechanically-dehydrated sludge in a sludge tank, meanwhile crashing the mechanically-dehydrated sludge with a strong shearing force stirrer in the sludge tank, quantitatively inputting crashed granular sludge into a sludge inlet at a bottom portion of a sludge homogenizer through an auger at a bottom portion of the sludge tank, inputting the sludge treated by the sludge homogenizer into a first single-screw pump through a sludge outlet at a top portion of the sludge homogenizer, inputting the sludge treated by the first single-screw pump into a hydrothermal unit; using a part of dehydrating filtrate from a dehydrator as a diluent, inputting the diluent into an ejector through a first low-voltage variable-frequency pump for ejecting flash steam; after ejecting, inputting a mixed fluid into the sludge homogenizer for homogenously slurrying, wherein a stirrer is provided inside the sludge homogenizer; inputting waste steam from the sludge homogenizer into a sludge diluent outlet pipe of the dehydrator for being absorbed;

2) inputting hydrothermal steam of a waste heat recovery unit into the hydrothermal unit for heating the sludge, wherein during heating, microbial flocculation in the sludge is dissolved, microbial cells are ruptured, and organics in the sludge is hydrolyzed, so as to lower a viscosity of the sludge and reduce a constraint capacity of emplastics on water;

3) inputting hydrothermal sludge from the hydrothermal unit into a flash reactor through a top portion thereof, lowering a pressure by dilatation inside the flash reactor and throttle at an inlet pipe, flashing the hydrothermal sludge and then absorbing heat for lowering a temperature of the hydrothermal sludge, and finally generating the flash steam and flash sludge, wherein the flash steam enters the ejector and the flash sludge enters the waste heat recovery unit;

4) wherein the waste heat recovery unit comprises a furnace, a cooling tower, a second low-voltage variable-frequency pump, a second single-screw pump and a heat exchanger; firstly inputting circulating cooling water from a boiler water feed and the cooling tower into the second low-voltage variable-frequency pump for raising a pressure, then exchanging heat in the heat exchanger with the flash sludge whose pressure is raised by the second single-screw pump; dividing an output fluid of the heat exchanger into the circulating cooling water and boiler feeding water; inputting the circulating cooling water into the cooling tower through an outlet of the heat exchanger for being cooled, inputting cooled sludge after heat exchanging into the dehydrator for being dehydrated, inputting the boiler feeding water into the furnace through the outlet of the heat exchanger for being heated, so as to generate the hydrothermal steam which is a heat source for the hydrothermal unit; and 5) outputting dehydrated sludge, inputting another part of the dehydrating filtrate into the ejector of a homogeneous slurry unit, returning rest dehydrating filtrate to a sewage plant for treatment.

Preferably, in the step 1), a water content of the mechanically-dehydrated sludge is 80%, a viscosity thereof is 50,000 mPa·s-150,000 mPa·s; a water content of the sludge from the first single-screw pump is 84%-85%, a temperature thereof is 90° C.-100° C., a viscosity thereof is less than 8000 mPa·s;

wherein a water content of the sludge from the hydrothermal unit is 86%-88%, a temperature thereof is 170° C.-180° C., a viscosity thereof is less than 100 mPa·s.

Preferably, the diluent is inputted into a nozzle of the ejector by the first low-voltage variable-frequency pump, so as to eject the flashing steam nearby; the diluent and the flashing steam are thoroughly mixed during ejecting.

Preferably, the hydrothermal unit is an intermittent hydrothermal unit; wherein the intermittent hydrothermal unit comprises a hydrothermal steam heater, a first intermittent hydrothermal reactor and a second intermittent hydrothermal reactor; wherein the sludge from the first single-screw pump enters the hydrothermal steam heater from a bottom portion thereof for being rapidly stirred and heated until being hydrolyzed, then the sludge exits from a top portion of the hydrothermal steam heater and enters the first intermittent hydrothermal reactor for reacting; meanwhile, sludge in the second intermittent hydrothermal reactor is outputted to the flash reactor by a pressure difference; after a reaction time is over, the first intermittent hydrothermal reactor outputs the sludge while the second intermittent hydrothermal reactor intakes the sludge and reacts; repetition of above processes is provided.

Preferably, the hydrothermal unit is a radial flow hydrothermal reactor or a tower hydrothermal reactor;

wherein the radial flow hydrothermal reactor comprises an inner barrel, a guide barrel, an outer barrel, an inner barrel stirrer, and a barrel wall; wherein homogenous slurried sludge and hydrothermal steam from the furnace enter through an inlet pipe at a bottom portion of the inner barrel, then reach reaction parameters by stirring with the inner barrel stirrer, in such a manner that the viscosity is lowered and the homogenous slurried sludge and the hydrothermal steam overflow into the guide barrel, so as to enter a space of the outer barrel through an output at a bottom portion of the guide barrel and then radially flow outwards; finally, after a hydrothermal reaction, the sludge enters a loop space formed between the outer barrel and the barrel wall, for gathering and flowing out through an outlet at a bottom portion of the space;

wherein the tower hydrothermal reactor has an inlet at a bottom portion thereof and an outlet at a top portion thereof; an axial-force stirrer is provided at the bottom portion of the tower hydrothermal reactor, a non-axial-force stirrer is provided at the top portion of the tower hydrothermal reactor; wherein the homogenous slurried sludge and the hydrothermal steam from the furnace enter through the bottom portion of the tower hydrothermal reactor, then reach reaction parameters by circularly stirring with the axial-force stirrer, in such a manner that with a push effect of the homogenous slurried sludge which continuously enters a bottom portion space of the tower hydrothermal reactor, the sludge reaching the reaction parameters enters the top portion of the tower hydrothermal reactor, and finally flows out through the outlet at the top portion of the tower hydrothermal reactor.

Preferably, the heat exchanger is a tube heat exchanger, a plate heat exchanger, a spiral plate heat exchanger or a heat pipe heat exchanger; the dehydrator is a frame pressing filter, a belt pressing filter, a centrifuge, a chamber pressing filter or a membrane pressing filter.

Compared with conventional technologies, advantages of the present invention are as follows.

1) According to the present invention, before entering the first single-screw pump, the sludge is homogenized, so as to lowering the viscosity and be conducive to transportation. The sludge tank is higher than the sludge homogenizer, and the sludge homogenizer is higher than the first single-screw pump. Therefore, transportation of the homogeneous slurry unit is reliable and is not easy to be blocked. In the homogeneous slurry unit, the sludge tank firstly crashes and then transports the sludge by the auger for ensuring that the sludge which quantitatively enters the sludge homogenizer is divided into granules, so as to improve homogenization efficiency. In the homogeneous slurry unit, the dehydrating filtrate of the sludge is used as the diluent, which not only decreases a treatment volume of the dehydrating filtrate for saving system water consumption, but also recovers heat of the dehydrating filtrate. In the homogeneous slurry unit, the diluent and the flash steam are mixed in the ejector. Because of an ejecting effect, a mixing efficiency is high, and a problem that a flash steam pressure is low and the flash steam is not able to directly enter the sludge homogenizer. An ejecting mixture then enters the sludge homogenizer for homogenously slurrying with the sludge. During homogenously slurrying, the waste steam generated is added into the diluent pipeline for being absorbed, for avoiding entering atmosphere and causing peculiar smell. Meanwhile, the waste steam further pre-heats the diluent to some extent.

2) According to the present invention, the hydrothermal unit may be of different forms comprising an intermittent form and a continuous form. For the intermittent hydrothermal unit, the hydrothermal steam heater has the inlet at the bottom portion thereof and the outlet at the top portion thereof for ensuring a heating time, in such a manner that the sludge has enough time to reach optimized reaction parameters. For the continuous hydrothermal unit, the radial flow hydrothermal reactor or the tower hydrothermal reactor is adoptable, wherein the two reactors integrate heating and reacting. For the radial flow hydrothermal reactor, when a flow diameter is increased, a sludge flow speed will be lowered, so the reaction time is effectively guaranteed. For the tower hydrothermal reactor, there is a large height-diameter ratio. There are the inlet at the bottom portion thereof and the outlet at the top portion thereof, while the axial-force stirrer is provided at the top portion. As a result, the sludge at the top portion is driven only by a pushing force of the sludge at the bottom portion for flowing towards the outlet, so the reaction time is effectively guaranteed.

3) According to the present invention, the waste heat recovery unit recovers part heat of the flash sludge through the boiler feeding water, so as to save fuel consumption of the furnace. In the waste heat recovery unit, viscosities of fluids at two sides of the heat exchanger are relatively low, so the heat exchanger is difficult to be blocked.

Element reference: 1—sludge tank, 2—sludge homogenizer, 3—hydrothermal unit, 4—flash reactor, 5—heat exchanger, 6—dehydrator, 7—cooling tower, 8—furnace, 9—ejector, 101—first single-screw pump, 102—second single-screw pump, 111—first low-voltage variable-frequency pump, 112—second low-voltage variable-frequency pump, 12—hydrothermal steam heater, 13—intermittent hydrothermal unit, 131—first intermittent hydrothermal reactor, 132—second intermittent hydrothermal reactor, 14—radial flow hydrothermal reactor, 141—inner barrel, 142—guide barrel, 143—outer barrel, 144—inner barrel stirrer, 145—barrel wall, 15—hydrothermal reactor, 151—axial-force stirrer, 152—non-axial-force stirrer.

DETAILED DESCRIPTION OF THE PREFERRED EMBODIMENT

Figure 1:
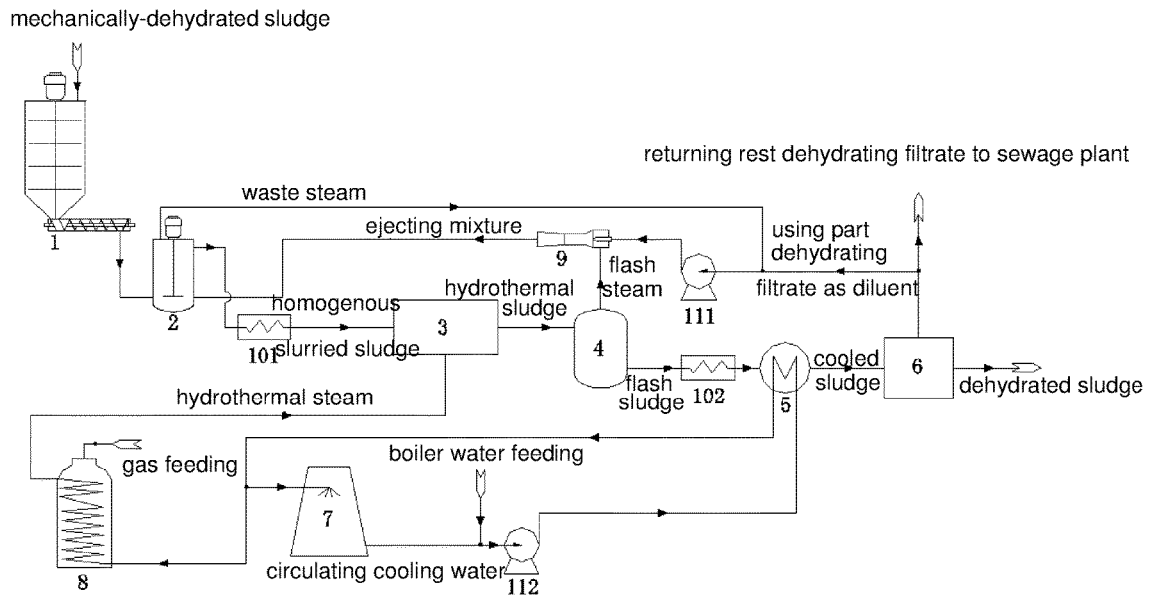
FIG. 1 is a sketch view of a sludge dehydrating method based on a thermal hydrolysis technology of the present invention.

Referring to FIG. 1, a sludge dehydrating system based on a thermal hydrolysis technology, comprising: a homogeneous slurry unit, a hydrothermal unit 3, a flash reactor 4, a waste heat recovery unit, and a dehydrator 6.

Connection of the homogeneous slurry unit is: mechanically-dehydrated sludge is stored in a sludge tank 1, meanwhile the mechanically-dehydrated sludge is crashed with a strong shearing force stirrer in the sludge tank 1, crashed granular sludge is quantitatively inputted into a sludge inlet at a bottom portion of a sludge homogenizer 2 through an auger at a bottom portion of the sludge tank 1; for better transportation, the sludge tank 1 is placed above the sludge homogenizer 2. A part of dehydrating filtrate from a dehydrator 6, which is used as a diluent, enters an inlet of a first low-voltage variable-frequency pump 111. An outlet of the first low-voltage variable-frequency pump 111 is connected to an inlet of an ejector 9. Meanwhile, flash steam outputted by the flash reactor 4 also enters the ejector 9, and then enters an ejecting mixture inlet at a bottom portion of the sludge homogenizer 2 with ejecting of the diluent. Through a sludge outlet at a top portion of the sludge homogenizer 2, the sludge enters a first single-screw pump 101 for increasing a pressure, and then enters a hydrothermal unit 3. For better transportation, the sludge homogenizer 2 is placed above the first single-screw pump 101, and a waste steam outlet at the top portion of the sludge homogenizer 2 is connected to a sludge diluent outlet of the dehydrator 6.

Connection of the flash reactor 4 is: the sludge from the homogenous slurry unit enters an inlet of the hydrothermal unit 3, an outlet of the hydrothermal unit 3 is connected to an inlet at a top portion of the flash reactor 4, a flash sludge outlet at a bottom portion of the flash reactor 4 is connected to the waste heat recovery unit. A flash stem outlet at the top portion of the flash reactor 4 is connected to the inlet of the ejector 9.

Connection of the waste heat recovery unit: the sludge outlet of the flash reactor 4 is connected to an inlet of a second single-screw pump 102, an outlet of the second single-screw pump 102 is connected a shell-side inlet of a heat exchanger 5; a water feeding pipe of a boiler and a cooled water outlet of a cooling tower 7 are connected to an inlet of a second low-voltage variable-frequency pump 112, an outlet of the second low-voltage variable-frequency pump 112 is connected to a pipe-side inlet of the heat exchanger 5 for heat exchanging with the flash sludge. Boiler feeding water at a pipe-side outlet of the heat exchanger 5 enters an inlet of a furnace 8, and circulating water at the pipe-side outlet of the heat exchanger 5 enters a cooling tower 7; sludge at the pipe-side outlet of the heat exchanger 5 enters the dehydrator 6, for outputting dehydrated sludge, inputting a part of the dehydrating filtrate into the inlet of the first low-voltage variable-frequency pump 111, and returning rest dehydrating filtrate to a sewage plant for treatment.

Figure 2:
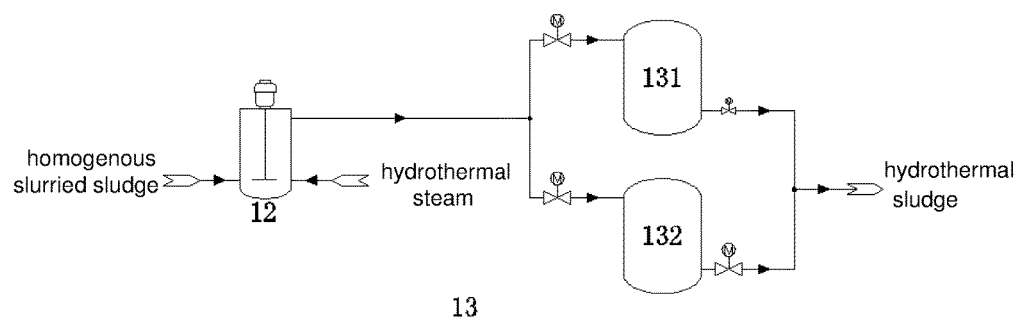
FIG. 2 is a sketch view of an intermittent hydrothermal unit of the present invention.

The hydrothermal unit 3 may be of an intermittent form of a continuous form. Referring to FIG. 2, basic flow of an intermittent hydrothermal unit 13 is as follows:

homogenized sludge enters a sludge inlet at a bottom portion of the hydrothermal steam heater 12, hydrothermal steam at the outlet of the furnace 8 is connected to a hydrothermal steam inlet at the bottom portion of the hydrothermal steam heater 12, an outlet at a top portion of the hydrothermal steam heater 12 is connected to the first intermittent hydrothermal reactor 131 and the second intermittent hydrothermal reactor 132, wherein the first intermittent hydrothermal reactor 131 and the second intermittent hydrothermal reactor 132 are connected to each other in parallel; electric stop valves are provided between the hydrothermal steam heater 12 and the first intermittent hydrothermal reactor 131, between the hydrothermal steam heater 12 and the second intermittent hydrothermal reactor 132, at an outlet of the first intermittent hydrothermal reactor 131, and at an outlet of the second intermittent hydrothermal reactor 132.

The hydrothermal unit 3 may be of the intermittent form of the continuous form. The continuous hydrothermal unit comprises a continuous hydrothermal reactor, wherein the continuous hydrothermal reactor is a radial flow hydrothermal reactor 14 or a tower hydrothermal reactor 15; referring to FIG. 3, basic flow and connection of the radial flow hydrothermal reactor 15 are illustrated as follows:

wherein the radial flow hydrothermal reactor 14 is a container with a height-diameter ratio of less than 1, comprising an inner barrel 141, a guide barrel 142, an outer barrel 143, an inner barrel stirrer 144, and a barrel wall 145; wherein homogenous slurried sludge and hydrothermal steam from the furnace 8 enter through an inlet pipe at a bottom portion of the inner barrel 141, then reach reaction parameters by stirring with the inner barrel stirrer 144, in such a manner that the viscosity is lowered and the homogenous slurried sludge and the hydrothermal steam overflow into the guide barrel 142, so as to enter a space of the outer barrel 143 through an output at a bottom portion of the guide barrel 142 and then radially flow outwards for ensuring a reaction time; finally, after a hydrothermal reaction, the sludge enters a loop space formed between the outer barrel 143 and the barrel wall 145, for gathering and flowing out through an outlet at a bottom portion of the space.

Figure 4:
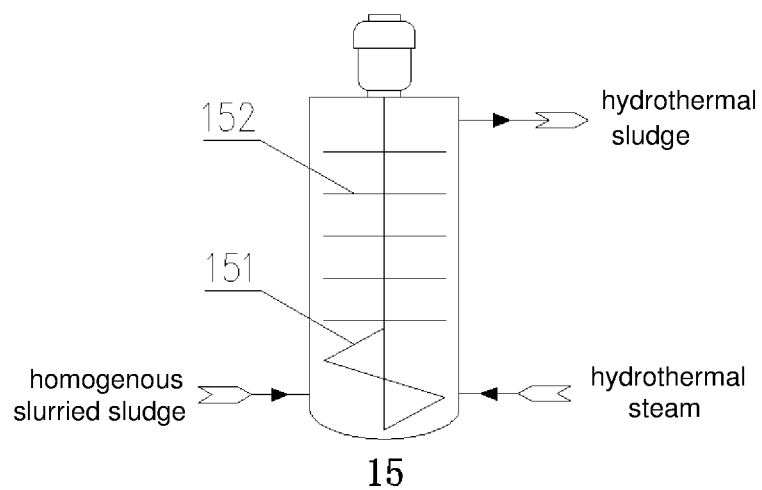
FIG. 4 is a sketch view of tower hydrothermal reactor of the present invention.
Figure 5:
FIG. 5 illustrates legends and codes of FIGS. 1-4.
Figure 5:
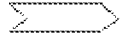
Figure 5:
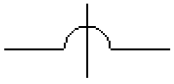
Figure 5:

Referring to FIG. 4, basic flow and connection of a tower hydrothermal reactor 15 are illustrated as follows:

the tower hydrothermal reactor 15 has a height-diameter ration of larger than 2, an inlet at a bottom portion thereof and an outlet at a top portion thereof; an axial-force stirrer 151 is provided at the bottom portion of the tower hydrothermal reactor 15, a non-axial-force stirrer 152 is provided at the top portion of the tower hydrothermal reactor 15. The homogenous slurried sludge and the hydrothermal steam from the furnace 8 enter through the bottom portion of the tower hydrothermal reactor 15, then reach reaction parameters by circularly stirring with the axial-force stirrer 151, in such a manner that with a push effect of the homogenous slurried sludge which continuously enters a bottom portion space of the tower hydrothermal reactor 15, the sludge reaching the reaction parameters enters the top portion of the tower hydrothermal reactor 15, wherein a reaction time is guaranteed due to the non-axial-force stirrer 152 at the top portion of the tower hydrothermal reactor 15; finally, the sludge flows out through the outlet at the top portion of the tower hydrothermal reactor 15.

Referring to FIG. 1, a sludge dehydrating method based on a thermal hydrolysis technology is illustrated, comprising steps of:

1) storing mechanically-dehydrated sludge with a water content of 80% and a viscosity of 50,000 mPa·s-100,000 mPa·s in a sludge tank 1, meanwhile crashing the mechanically-dehydrated sludge with a strong shearing force stirrer in the sludge tank 1, quantitatively inputting crashed granular sludge into a sludge inlet at a bottom portion of a sludge homogenizer 2 through an auger at a bottom portion of the sludge tank 1, wherein by decreasing a particle size, a following homogenizing effect will be improved; wherein the sludge tank 1 is placed above the sludge homogenizer 2 and the sludge homogenizer 2 is placed above the first single-screw pump 101 for avoiding being blocked; using a part of dehydrating filtrate from a dehydrator 6 as a diluent, inputting the diluent into an ejector 9 through a first low-voltage variable-frequency pump 111 for ejecting flash steam, wherein a mixing efficiency of ejecting is high, and a problem that a pressure of the flash steam is too low to enter the sludge homogenizer 2 is solved; after ejecting, inputting a mixed fluid into the sludge homogenizer 2 for homogenously slurrying, wherein a stirrer is provided inside the sludge homogenizer 2, so as to provide a high mixing efficiency; a water content of the sludge after homogenously slurried is 84%-85%, a temperature thereof is 90° C.-100° C., and a viscosity thereof is decreased from an initial 100,000 mPa·s to about 8000 mPa·s; the sludge is in a state of a homogenous slurry fluid, so as to be conducive to transportation of the first single-screw pump 101; meanwhile, the homogenous slurry unit recovers the heat of the flash steam for saving the hydrothermal steam, so as to save fuel of the furnace 8; inputting waste steam from the sludge homogenizer 2 into a sludge diluent outlet pipe of the dehydrator 6 for being absorbed, which prevents the waste steam from entering atmosphere and causing peculiar smell; meanwhile, the waste steam further pre-heats the diluent to some extent.

2) inputting the homogenous slurried sludge into the hydrothermal unit 3, wherein the hydrothermal unit 3 may be of the intermittent form of the continuous form; inputting hydrothermal steam of a waste heat recovery unit into the hydrothermal unit 3 for heating the sludge, wherein during heating, microbial flocculation in the sludge is dissolved, microbial cells are ruptured, and organics in the sludge is hydrolyzed, so as to lower a viscosity of the sludge and reduce a constraint capacity of emplastics on water, wherein additionally, when the sludge is heated to a certain temperature, organic cells are broken; as a result, macromolecular organics in the cell are released and hydrolyzed, and moisture corresponding to the macromolecular organics in the cells is also released, in such a manner that the water is easier to be separated from the sludge granule; a water content of the sludge from the hydrothermal unit 3 is 86%-88%, a temperature thereof is 170° C.-180° C., a viscosity thereof is less than 100 mPa·s;

3) inputting hydrothermal sludge from the hydrothermal unit 3 into a flash reactor 4 through a top portion thereof, lowering a pressure by dilatation inside the flash reactor 4 and throttle at an inlet pipe, flashing the hydrothermal sludge and then absorbing heat for lowering a temperature of the hydrothermal sludge, and finally generating the flash steam and flash sludge, wherein the flash steam enters the ejector 9 of the homogenous slurry unit and the flash sludge enters the waste heat recovery unit;

4) wherein the waste heat recovery unit comprises a furnace 8, a cooling tower 7, a second low-voltage variable-frequency pump 112, a second single-screw pump 102 and a heat exchanger 5; firstly inputting circulating cooling water from a boiler water feed and the cooling tower 7 into the second low-voltage variable-frequency pump 112 for raising a pressure, then exchanging heat in the heat exchanger 5 with the flash sludge whose pressure is raised by the second single-screw pump 102, wherein a viscosity of the flash sludge is relatively low, in such a manner that the heat exchanger 5 is difficult to be blocked; dividing an output fluid of the heat exchanger 5 into the circulating cooling water and boiler feeding water; inputting the circulating cooling water into the cooling tower 7 through an outlet of the heat exchanger 5 for being cooled, inputting cooled sludge after heat exchanging into the dehydrator 6 for being dehydrated, inputting the boiler feeding water into the furnace 8 through the outlet of the heat exchanger 5 for being heated, so as to generate the hydrothermal steam which is a heat source for the hydrothermal unit 3, wherein the waste heat recovery unit recovers a part of the heat of the flash sludge with the boiler feeding water, so as to save the fuel consumption of the furnace 8; meanwhile, after passing through the waste heat recovery unit, the flash sludge is cooled and water is separated from the sludge granule, which is conducive to following dehydrating; and 5) outputting dehydrated sludge, inputting another part of the dehydrating filtrate into the ejector 9 of a homogeneous slurry unit, and returning rest dehydrating filtrate to a sewage plant for treatment, wherein after hydrothermal reaction, cell walls of the sludge are broken, moisture in the cells are released, the organics are hydrolyzed, a gel structure is broken, and the viscosity is lowered, so the water content is significantly lowered after final dehydrating; for centrifuge dehydrating, a water content is about 50%, and for pressing filter dehydrating, a water content is about 30%.

Referring to FIG. 2, a working principle of the intermittent hydrothermal unit 13 is as follows:

the intermittent hydrothermal unit 13 comprises the hydrothermal steam heater 12, the first intermittent hydrothermal reactor 131 and the second intermittent hydrothermal reactor 132; wherein the sludge from the homogenous slurry unit enter the hydrothermal steam heater 12 through the bottom portion thereof for being rapidly stirred and heated; because the sludge enters the hydrothermal steam heater 12 through the bottom portion thereof and exist the hydrothermal steam heater 12 through the top portion thereof, a staying time is guaranteed, so as to ensure that the sludge is heated to optimized hydrolyzing parameters before entering the first intermittent hydrothermal reactor 131 or the second intermittent hydrothermal reactor 132 through the outlet on the top portion for hydrothermal reaction; because the hydrothermal reactor intermittently and alternatively works, and the electric stop valves are able to control input and output of the sludge in the hydrothermal reactor, the reaction time is able to be precisely controlled.

Figure 3:
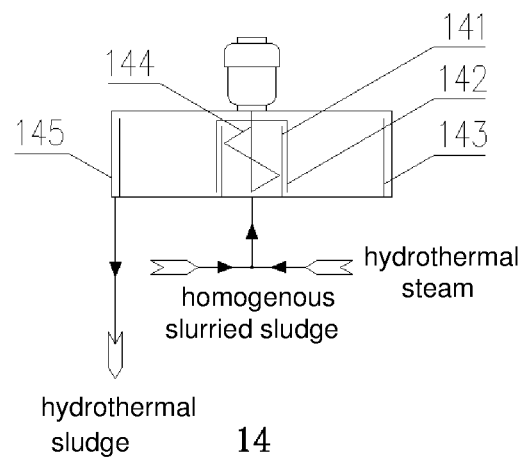
FIG. 3 is a sketch view of a radial flow hydrothermal reactor of the present invention.

Referring to FIG. 3, a working principle of the radial flow hydrothermal reactor 14 is as follows:

the radial flow hydrothermal reactor 14 is a container with a height-diameter ratio of less than 1, comprising the inner barrel 141, the guide barrel 142, the outer barrel 143, the inner barrel stirrer 144, and the barrel wall 145; wherein the homogenous slurried sludge and the hydrothermal steam from the furnace 8 enter through the inlet pipe at the bottom portion of the inner barrel 141, then reach the reaction parameters by stirring with the inner barrel stirrer 144, in such a manner that the viscosity is lowered to less than 100 mPa·s with a sufficient fluidity; as a result, the homogenous slurried sludge and the hydrothermal steam smoothly enter the guide barrel 142; wherein an outlet is provided at a bottom of the guide barrel 142, in such a manner that the sludge reaching the reaction parameters enters a space of the outer barrel 143 through the guide barrel 142; because the height-diameter ratio of the radial flow hydrothermal reactor 14 is small, the sludge radially flows outwards; when a flow diameter is increased, a flow rate will be lowered for ensuring a reaction time within a limited space of the reactor; finally, after the hydrothermal reaction, the sludge enters a loop space formed between the outer barrel 143 and the barrel wall 145, for gathering and flowing out through an outlet at a bottom portion of the space.

Referring to FIG. 4, a working principle of the tower hydrothermal reactor 15 is as follows:

the tower hydrothermal reactor 15 has the height-length ratio of larger than 2, the inlet at the bottom portion thereof and the outlet at the top portion thereof; the axial-force stirrer 151 is provided at the bottom portion of the tower hydrothermal reactor 15, in such a manner that the homogenous slurried sludge and the hydrothermal steam reach the reaction parameters by circularly stirring with the axial-force stirrer 151; as a result, with a push effect of the homogenous slurried sludge which continuously enters a bottom portion space of the tower hydrothermal reactor 15, the sludge reaching the reaction parameters enters the top portion of the tower hydrothermal reactor 15; because the non-axial-force stirrer 152 is provided at the top portion of the tower hydrothermal reactor 15; wherein the sludge is driven only by a pushing force of the sludge at the bottom portion for flowing towards the outlet; therefore, the reaction time is guaranteed, and the sludge finally flows out through the outlet at the top portion of the tower hydrothermal reactor 15.

What is claimed is:

1. A sludge dehydrating system based on a thermal hydrolysis technology, comprising: a homogeneous slurry unit, a hydrothermal unit (3), a flash reactor (4), a waste heat recovery unit, and a dehydrator (6);

wherein the homogeneous slurry unit comprises a sludge tank (1), a sludge homogenizer (2) and a first single-screw pump (101); wherein a bottom portion of the sludge tank (1) is connected to a sludge inlet at a bottom portion of the sludge homogenizer (2); a sludge outlet at a top portion of the sludge homogenizer (2) is connected to an inlet of the hydrothermal unit (3);

wherein an outlet of the hydrothermal unit (3) is connected to an inlet at a top portion of the flash reactor (4), and a sludge outlet at a bottom portion of the flash reactor (4) is connected to an inlet of the waste heat recovery unit;

wherein an outlet of the waste heat recovery unit is connected to the dehydrator (6); a dehydrating filtrate outlet pipe of the dehydrator (6) is connected to an inlet of a first low-voltage variable-frequency pump (111), an outlet of the first low-voltage variable-frequency pump (111) is connected to an ejecting fluid inlet of an ejector (9); a steam outlet of the flash reactor (4) is connected to an ejected fluid inlet of the ejector (9), an outlet of the ejector (9) is connected to an ejecting mixture inlet at the bottom portion of the sludge homogenizer (2), a waste steam outlet at the top portion of the sludge homogenizer (2) is connected to a sludge diluent outlet of the dehydrator (6).

2. The sludge dehydrating system, as recited in claim 1, wherein the sludge outlet of the flash reactor (4) is connected to an inlet of a second single-screw pump (102), an outlet of the second single-screw pump (102) is connected a shell-side inlet of a heat exchanger (5); a water feeding pipe of a boiler and a cooled water outlet of a cooling tower (7) are connected to an inlet of a second low-voltage variable-frequency pump (112), an outlet of the second low-voltage variable-frequency pump (112) is connected to a pipe-side inlet of the heat exchanger (5); a pipe-side outlet of the heat exchanger (5) is divided into two portions and respectively connected to an inlet of a furnace (8) and an inlet of the cooling tower (7); a shell-side outlet of the heat exchanger (5) is connected to the dehydrator (6).

3. The sludge dehydrating system, as recited in claim 1, wherein the sludge tank (1) is placed above the sludge homogenizer (2); the sludge homogenizer (2) is placed above the first single-screw pump (101).

4. The sludge dehydrating system, as recited in claim 1, wherein the hydrothermal unit (3) is an intermittent hydrothermal unit (13) or a continuous hydrothermal unit;

wherein the intermittent hydrothermal unit (13) comprises a hydrothermal steam heater (12), a first intermittent hydrothermal reactor (131) and a second intermittent hydrothermal reactor (132); wherein an outlet of the first single-screw pump (101) is connected to a sludge inlet at a bottom portion of the hydrothermal steam heater (12), a steam outlet of a furnace (8) is connected to a hydrothermal steam inlet at the bottom portion of the hydrothermal steam heater (12), an outlet at a top portion of the hydrothermal steam heater (12) is connected to the first intermittent hydrothermal reactor (131) and the second intermittent hydrothermal reactor (132), wherein the first intermittent hydrothermal reactor (131) and the second intermittent hydrothermal reactor (132) are connected to each other in parallel; electric stop valves are provided at inlets and outlets of the first intermittent hydrothermal reactor (131) and the second intermittent hydrothermal reactor (132); the outlets of the first intermittent hydrothermal reactor (131) and the second intermittent hydrothermal reactor (132) are connected to the inlet at the top portion of the flash reactor (4);

wherein the continuous hydrothermal unit comprises a continuous hydrothermal reactor, wherein the continuous hydrothermal reactor is a radial flow hydrothermal reactor (14) or a tower hydrothermal reactor (15);

wherein the radial flow hydrothermal reactor (14) is a container with a height-diameter ratio of less than 1, comprising an inner barrel (141), a guide barrel (142), an outer barrel (143), an inner barrel stirrer (144), and a barrel wall (145); wherein the inner barrel stirrer (144) is provided inside the inner barrel (141), the guide barrel (142) is provided outside the inner barrel (141), the outer barrel (143) is provided at an inner circumference of the barrel wall (145); the outlet of the first single-screw pump (101) and the steam outlet of the furnace (8) are connected to an inlet pipe at a bottom of the inner barrel (141), an outlet at a bottom portion of a loop space formed between the outer barrel (143) and the barrel wall (145) is connected to the inlet at the top portion of the flash reactor (4);

wherein the tower hydrothermal reactor (15) is a container with an inlet at a bottom portion thereof, an outlet at a top portion thereof, and a height-diameter ration of larger than 2; an axial-force stirrer (151) is provided at the bottom portion of the tower hydrothermal reactor (15), a non-axial-force stirrer (152) is provided at the top portion of the tower hydrothermal reactor (15); the outlet of the first single-screw pump (101) and the steam outlet of the furnace (8) are connected to the inlet at the bottom of the tower hydrothermal reactor (15), the outlet at the top portion of the tower hydrothermal reactor (15) is connected to the inlet at the top portion of the flash reactor (4).

5. A sludge dehydrating method based on a thermal hydrolysis technology, comprising steps of:

1) storing mechanically-dehydrated sludge in a sludge tank (1), meanwhile crashing the mechanically-dehydrated sludge with a strong shearing force stirrer in the sludge tank (1), quantitatively inputting crashed granular sludge into a sludge inlet at a bottom portion of a sludge homogenizer (2) through an auger at a bottom portion of the sludge tank (1), inputting the sludge treated by the sludge homogenizer (2) into a first single-screw pump (101) through a sludge outlet at a top portion of the sludge homogenizer (2), inputting the sludge treated by the first single-screw pump (101) into a hydrothermal unit (3); using a part of dehydrating filtrate from a dehydrator (6) as a diluent, inputting the diluent into an ejector (9) through a first low-voltage variable-frequency pump (111) for ejecting flash steam; after ejecting, inputting a mixed fluid into the sludge homogenizer (2) for homogenously slurrying, wherein a stirrer is provided inside the sludge homogenizer (2); inputting waste steam from the sludge homogenizer (2) into a sludge diluent outlet pipe of the dehydrator (6) for being absorbed;

2) inputting hydrothermal steam of a waste heat recovery unit into the hydrothermal unit (3) for heating the sludge, wherein during heating, microbial flocculation in the sludge is dissolved, microbial cells are ruptured, and organics in the sludge is hydrolyzed, so as to lower a viscosity of the sludge and reduce a constraint capacity of emplastics on water;

3) inputting hydrothermal sludge from the hydrothermal unit (3) into a flash reactor (4) through a top portion thereof, lowering a pressure by dilatation inside the flash reactor (4) and throttle at an inlet pipe, flashing the hydrothermal sludge and then absorbing heat for lowering a temperature of the hydrothermal sludge, and finally generating the flash steam and flash sludge, wherein the flash steam enters the ejector (9) and the flash sludge enters the waste heat recovery unit;

4) wherein the waste heat recovery unit comprises a furnace (8), a cooling tower (7), a second low-voltage variable-frequency pump (112), a second single-screw pump (102) and a heat exchanger (5); firstly inputting circulating cooling water from a boiler water feed and the cooling tower (7) into the second low-voltage variable-frequency pump (112) for raising a pressure, then exchanging heat in the heat exchanger (5) with the flash sludge whose pressure is raised by the second single-screw pump (102); dividing an output fluid of the heat exchanger (5) into the circulating cooling water and boiler feeding water; inputting the circulating cooling water into the cooling tower (7) through an outlet of the heat exchanger (5) for being cooled, inputting cooled sludge after heat exchanging into the dehydrator (6) for being dehydrated, inputting the boiler feeding water into the furnace (8) through the outlet of the heat exchanger (5) for being heated, so as to generate the hydrothermal steam which is a heat source for the hydrothermal unit (3); and 5) outputting dehydrated sludge, inputting another part of the dehydrating filtrate into the ejector (9) of a homogeneous slurry unit, and returning rest dehydrating filtrate to a sewage plant for treatment.

6. The sludge dehydrating method, as recited in claim 5, wherein in the step 1), a water content of the mechanically-dehydrated sludge is 80%, a viscosity thereof is 50,000 mPa·s-150,000 mPa·s; a water content of the sludge from the first single-screw pump (101) is 84%-85%, a temperature thereof is 90° C.-100° C., a viscosity thereof is less than 8000 mPa·s;

wherein a water content of the sludge from the hydrothermal unit (3) is 86%-88%, a temperature thereof is 170° C.-180° C., a viscosity thereof is less than 100 mPa·s.

7. The sludge dehydrating method, as recited in claim 5, wherein the diluent is inputted into a nozzle of the ejector (9) by the first low-voltage variable-frequency pump (111), so as to eject the flashing steam nearby; the diluent and the flashing steam are thoroughly mixed during ejecting.

8. The sludge dehydrating method, as recited in claim 5, wherein the hydrothermal unit (3) is an intermittent hydrothermal unit (13); wherein the intermittent hydrothermal unit (13) comprises a hydrothermal steam heater (12), a first intermittent hydrothermal reactor (131) and a second intermittent hydrothermal reactor (132); wherein the sludge from the first single-screw pump (111) enters the hydrothermal steam heater (12) from a bottom portion thereof for being rapidly stirred and heated until being hydrolyzed, then the sludge exits from a top portion of the hydrothermal steam heater (12) and enters the first intermittent hydrothermal reactor (131) for reacting; meanwhile, sludge in the second intermittent hydrothermal reactor (132) is outputted to the flash reactor (4) by a pressure difference; after a reaction time is over, the first intermittent hydrothermal reactor (131) outputs the sludge while the second intermittent hydrothermal reactor (132) intakes the sludge and reacts; repetition of above processes is provided.

9. The sludge dehydrating method, as recited in claim 5, wherein the hydrothermal unit (3) is a radial flow hydrothermal reactor (14) or a tower hydrothermal reactor (15);

wherein the radial flow hydrothermal reactor (14) comprises an inner barrel (141), a guide barrel (142), an outer barrel (143), an inner barrel stirrer (144), and a barrel wall (145); wherein homogenous slurried sludge and hydrothermal steam from the furnace (8) enter through an inlet pipe at a bottom portion of the inner barrel (141), then reach reaction parameters by stirring with the inner barrel stirrer (144), in such a manner that the viscosity is lowered and the homogenous slurried sludge and the hydrothermal steam overflow into the guide barrel (142), so as to enter a space of the outer barrel (143) through an output at a bottom portion of the guide barrel (142) and then radially flow outwards; finally, after a hydrothermal reaction, the sludge enters a loop space formed between the outer barrel (143) and the barrel wall (145), for gathering and flowing out through an outlet at a bottom portion of the space;

wherein the tower hydrothermal reactor (15) has an inlet at a bottom portion thereof and an outlet at a top portion thereof; an axial-force stirrer (151) is provided at the bottom portion of the tower hydrothermal reactor (15), a non-axial-force stirrer (152) is provided at the top portion of the tower hydrothermal reactor (15); wherein the homogenous slurried sludge and the hydrothermal steam from the furnace (8) enter through the bottom portion of the tower hydrothermal reactor (15), then reach reaction parameters by circularly stirring with the axial-force stirrer (151), in such a manner that with a push effect of the homogenous slurried sludge which continuously enters a bottom portion space of the tower hydrothermal reactor (15), the sludge reaching the reaction parameters enters the top portion of the tower hydrothermal reactor (15), and finally flows out through the outlet at the top portion of the tower hydrothermal reactor (15).

10. The sludge dehydrating method, as recited in claim 5, wherein the heat exchanger (5) is a tube heat exchanger, a plate heat exchanger, a spiral plate heat exchanger or a heat pipe heat exchanger; the dehydrator (6) is a frame pressing filter, a belt pressing filter, a centrifuge, a chamber pressing filter or a membrane pressing filter.

* * * * *